United States Patent [19]

Hinden

[11] 4,327,272
[45] Apr. 27, 1982

[54] METHOD FOR SPOT WELDING GALVANIZED SHEET METAL

[75] Inventor: Milton Hinden, Massapequa, N.Y.
[73] Assignee: The Hinden Trust, Massapequa, N.Y.
[21] Appl. No.: 20,443
[22] Filed: Mar. 14, 1979
[51] Int. Cl.³ ............................................ B23K 11/16
[52] U.S. Cl. ........................................ 219/94; 219/118
[58] Field of Search ...................... 219/92, 93, 94, 103, 219/118, 73.14, 73.15

[56] References Cited

U.S. PATENT DOCUMENTS

| | | | |
|---|---|---|---|
| 1,020,991 | 3/1912 | Lachman | 219/93 |
| 1,592,605 | 7/1926 | Ledwinka | 219/94 |
| 2,014,090 | 9/1935 | Schnetzer | 219/92 |
| 2,623,974 | 12/1952 | Prucha | 219/93 |
| 3,694,614 | 9/1972 | Bihler | 219/103 |

*Primary Examiner*—E. A. Goldberg
*Attorney, Agent, or Firm*—Mark T. Basseches; Paula T. Basseches

[57] ABSTRACT

The present invention is directed to an improved method and apparatus for effecting spot welds between superimposed sheets of galvanized metal. In accordance with the method, one of the electrodes is comprised of a consumable tip component, preferably a steel ball, whereby predictable and repeatable welding conditions are effected at each welding cycle. The invention is further directed to a method of effecting spot welds between galvanized sheets which includes the step of interposing between a conductive carrier electrode and the metal surface a consumable metallic increment having reduced contact area adapted to engage the galvanized sheet, the consumable component being compatible with the ferrous substrate beneath the galvanized layer.

11 Claims, 3 Drawing Figures

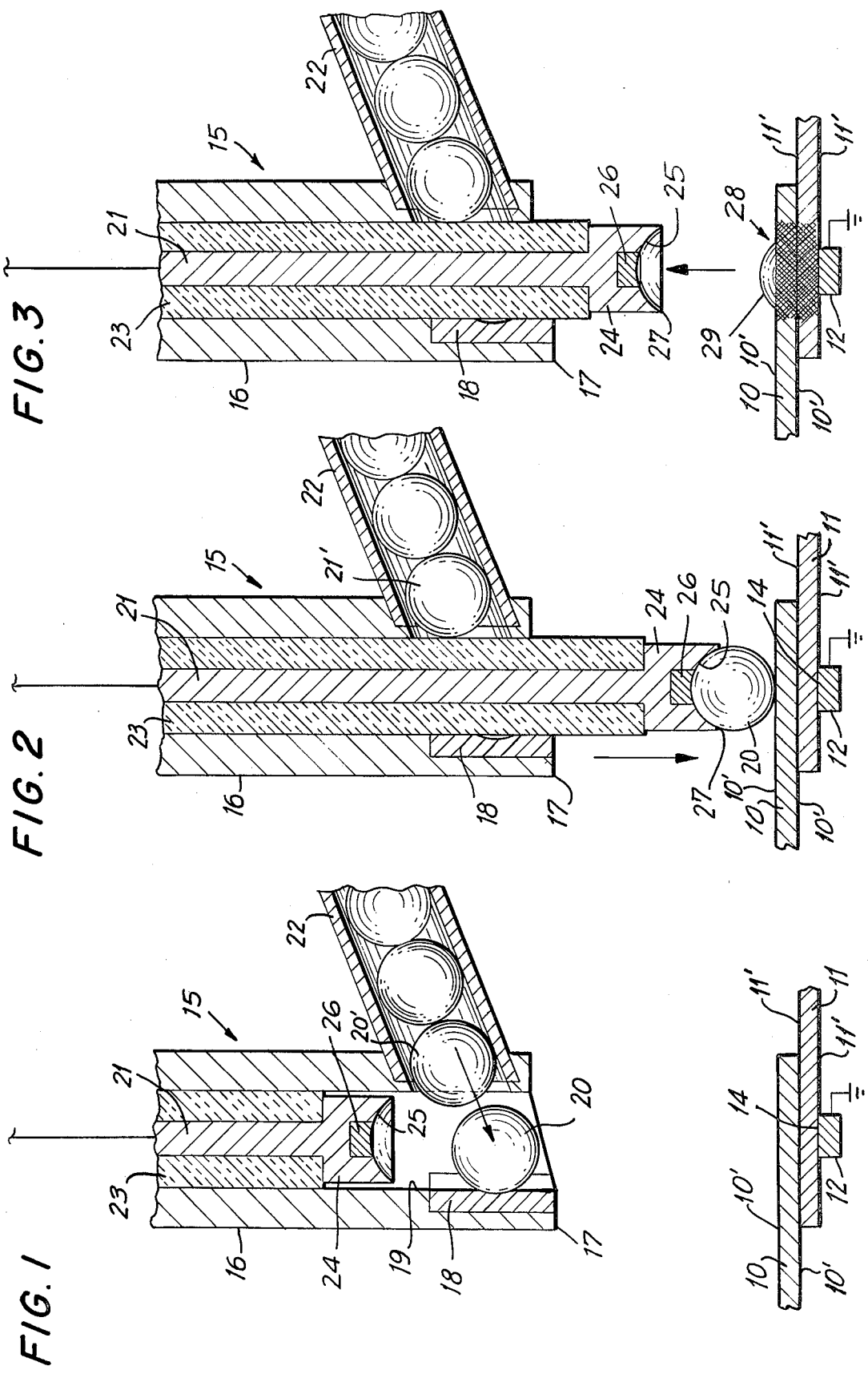

METHOD FOR SPOT WELDING GALVANIZED SHEET METAL

BACKGROUND OF THE INVENTION

1. Field of the Invention

The present invention is in the field of spot welding, and more particularly relates to an improved method and apparatus for effecting spot welds between superimposed galvanized metal sheets.

2. The Prior Art

Spot welding has long been recognized as an effective and economical technique for connecting superimposed sheets of metal. In accordance with typical spot welding practice, superimposed metal sheets are clamped between arms defining electrodes. Preferably the electrode tips are pointed and are compressed against registering opposed faces of the sheets.

A high current is applied for a short period of time, resulting in melting of the metal in the area between the tips and fusing together of the sheets in the molten area.

Since welding is effected utilizing low voltages and high amperages, welding can be accomplished only after each of the electrodes is in good electrical contact with the metal. The desired effective electrical contact with the metal is best achieved when the electrodes are sharp and are thus able to penetrate any scale or zinc coatings (in the case of galvanized iron).

The typical metal employed for spot welding electrodes is copper since copper is not compatible with the molten metal formed in the course of the welding operation and thus a copper electrode may be readily lifted clear after a weld has been effected. While copper electrodes have the advantage of incompatibility to the molten material and excellent electrical conductivity, copper electrodes are disadvantageous in that the same are soft, particularly at welding temperatures, and exhibit a tendency to mushroom or flatten at the tip area, with the result that an initially sharp copper electrode which may readily make good contact under forces in the area of 50 to 80 pounds soon becomes rounded or flattened. As a result of such tendency, it is common practice, particularly where spot welds are to be effected between galvanized sheets, for the operator to tilt or wiggle the sheet or the electrodes or both to facilitate at least partial penetration to the base metal. If the current is applied without such penetration, the zinc with which the electrodes are in contact will volatilize, with substantial sparking and spattering and there will be insufficient melting of base metal to effect a proper connection between the sheets.

To compensate for the mushrooming tendencies described and for coating of the electrodes by volatilized zinc, it is common practice for welders to file or redress the points of the electrodes, with resultant reduced productivity and premature consumption of the electrodes.

A further disadvantage of current spot welding techniques, occasioned in large measure by the inability of the welding device to achieve effective contact with the sheets to be connected, is that one or both of the electrodes be water cooled, utilizing an open water cooling system wherein a continuous supply of cold water is circulated, with resultant water wastage. This type of water cooling is required in part because of the excess heat generated by the welding electrodes in burning through the galvanized coating.

It will thus be appreciated that the amount of electricity in the course of forming a spot weld using conventional equipment, and the consequent cooling requirements, could be greatly reduced if good contact with base metal were assured and the energy required to reach base metal eliminated.

A further exposition of the problems of spot welding galvanized metals is contained in U.S. Pat. No. 3,102,190 to Chapleur et al. (Aug. 27, 1963) and 3,909,581 to Stone et al. (Sept. 30, 1975), which patents propose to facilitate welding respectively by bonding powdered metal to the sheets in the weld area, and by the use of a welding tip alloyed with chromium, beryllium, zirconium, cadmium, silver, gold or platinum.

SUMMARY

The present invention may be summarized as directed to a method and apparatus for effecting spot welds between galvanized sheets, making efficient use of energy, and minimizing of the undesirable effects heretofore associated with welding galvanized sheets, namely, the formation of incomplete welds, arcing, spattering, and frequent attention to the welding tip.

In accordance with the method of the invention, one of the welding electrodes is comprised of a consumable material, preferably a steel ball, which defines the electrode tip, the ball being melted into the weld during each welding cycle and replaced by a further ball for the next cycle. By this means there is assured a predictable small contact area between the welding electrode and the galvanized sheet, such small contact area simplifying penetration to base metal. Since predictable penetration is provided, arcing, spattering and volatilization of zinc are minimized and substantially less electrical energy is required to be expended to effect a satisfactory weld.

Additionally, since much of the heat build-up in welding occurs within the steel ball and the steel ball is left to flow into the material of the weld, heat build-up in the welding electrode which carries the balls is minimized, simplifying the cooling operation of the electrode.

It has been determined that through the use of consumable electrode tips in accordance with the invention, a 10 kilovolt amp (kva) power pack may be used for an operating cycle of one tenth second to achieve fully satisfactory results in spot welding galvanized sheets of 18 to 24 gauge. In contrast, 20 to 40 kva power packs are customarily used for such operations.

A further advantage inhering in the method and apparatus of the present invention is that, due to the continuously optimized contact achieved by the consumable electrode tip, it is feasible to employ as the other or ground electrode a member having a relatively large, flat contacting area. The use of such large contact area is desirable in that it acts in the manner of a heat sink at the outer surface of the lowermost of the two superimposed sheets, whereby the discoloration and burning inherently present with welds formed in galvanized materials is eliminated or minimized.

Accordingly, it is an object of the present invention to provide an improved method of spot welding galvanized sheets.

A further object of the invention is the provision of a method of the type described wherein galvanized sheets may be spot welded together with minimal spattering, flash and zinc volatilization.

A still further object of the invention is the provision of a method of the type described wherein energy employed in welding is used in a highly efficient manner, enabling lower capacity welding equipment to form welds of strength equivalent to that heretofore achieved only with higher capacity devices.

It is a still further object of the invention to provide a method of spot welding of the type described wherein discoloration and burning heretofore associated with welds formed in galvanized metals is minimized or eliminated.

A still further object of the invention is the provision of a spot welding method for use particularly in the connection of galvanized metal sheets, employing a consumable metallic electrode tip, the tip being replaced following each cycle, whereby the contact area at each welding cycle is optimized for the particular welding condition.

A further object of the invention is the provision of a method of the type described which eliminates the necessity for sharpening or replacement of the main electrode member, as is necessary with conventional spot welding techniques.

Still a further object of the invention is the provision of an improved method for spot welding galvanized sheets which includes the step of interposing a consumable metal electrode tip, preferably a spherical member, in the current path, the consumable member being interposed between the surface of one of the two sheets to be spot welded and a welding electrode.

Another object of the invention is the provision of a spot welding apparatus particularly adapted for the welding of galvanized metal sheets.

Still another object of the invention is the provision of an apparatus of the type described, and including means for automatically feeding to an electrode a spherical or other shaped consumable member having a first and larger contact area in electrical connection with an electrode, and a second and reduced contact area adapted to be engaged against the surface of the sheets to be connected, the reduced contact area preferably being of such small size as to enable contact to be effected with the base metal responsive to the pressures normally exerted in the course of forming a spot weld, e.g. 50 to 80 pounds.

Still a further object of the invention is the provision of a spot welding apparatus particularly adapted to the spot welding of galvanized sheets comprising, in combination, a fixed electrode, an electrode movable toward and away from the fixed electrode, means for sequentially feeding to the movable electrode consumable metal members, such as spheres, means for urging the movable electrode toward the fixed electrode, and means for passing a welding current between the electrodes with the consumable electrode member forming a component of the circuit path, whereby a spot weld is formed and the material of the consumable member is deformed and flows into the weld.

Still a further object of the invention is the provision of an apparatus of the type described wherein the movable electrode includes a relatively large surface area engaged with a comparable surface area of the consumable member as contrasted with the area of the consumable member engaged against the metal sheets to be welded.

Still further it is an object of the invention to provide an apparatus of the type described wherein a consumable member is automatically fed to the movable electrode member to define a tip following each welding cycle.

To attain these objects and such further objects as may appear herein or be hereinafter pointed out, reference is made to the accompanying drawings, forming a part hereof, in which:

FIGS. 1, 2 and 3 are vertical sectional views, diagrammatic in nature, through the welding head of a welding apparatus showing sequentially the loading of a consumable welding tip into position within the welding electrode, advancement of the composite electrode into position for effecting a weld, and the position of the parts after a weld has been completed.

Referring now to the drawings, there is diagrammatically disclosed a welding apparatus and method particularly adapted for the spot welding of superimposed galvanized sheets.

Illustratively, where it is desired to connect by spot welding an upper galvanized sheet 10 having galvanized zinc coatings 10' and a lower galvanized sheet 11 having galvanized coatings 11', the superimposed sheets are placed atop a ground electrode 12. Whereas the ground electrode 12 in the illustrated embodiment is disclosed as having a planar upper surface 14, which surface may be round, square, etc. in plan, it will be readily recognized that the lower electrode may be sharpened or pointed so as to facilitate making contact with the base metal covered by the thin zinc skin which characterizes galvanized sheet material.

The use of a flat electrode, while advantageous in that marring or burning at the lowermost surface of the under sheet is minimized, requires the use of higher capacity welding apparatus.

An upper electrode assembly 15 is disposed in spaced relation to the electrode 12. While the electrode assembly 15 is shown to be vertically spaced above the electrode 12, it will be understood that positioning of the noted electrodes is immaterial to the satisfactory operation of the apparatus.

The electrode assembly 15 is comprised of a tubular guide sleeve 16 having adjacent its lower end 17 a magnet member 18 on the inner surface 19.

The magnet member 18 functions as a detent, releasibly supporting the lowermost consumable welding member 20 at a position adjacent the lower end 17 of the electrode assembly 15. The consumable members 20 preferably comprise spherical steel balls. While the spherical shape is advantageous in that steel balls are inexpensive to fabricate and may be readily fed to the electrode tip without orientation, the invention is not to be construed as limited to such shape.

Important attributes of the configuration of the consumable member 20 are that they present a reduced area contact with the upper galvanized sheet 10 when pressed against the surface thereof and that the interfit between the consumable member and the active electrode 21 provides a large contact area at the interface of the consumable member and the electrode. Additionally, it is desirable that the consumable member be of ferrous material since, due to the magnetic attractable properties, such material facilitates handling of the members. Also, ferrous materials are compatible with the weld and will flow and interfuse with the material of the sheets which are melted in the course of welding.

The consumable members 20, 20' may be guided to the welding assembly 15 in the tubular conduit 22 extending from a storage hopper (not shown).

In the "ready" position illustrated in FIG. 1, the lowermost ball 20 is shown to have descended the guideway 22 into retained position on the magnetic member 18, which may be recessed as at 18' to minimize the chance of the member 20 dropping free from the lower end of the electrode assembly 15.

In the formation of the weld, the active electrode 21, which is preferably encased in a heat resistant insulation sleeve 23, is shifted downwardly toward the superimposed sheets 10, 11. The base portion 24 of the active electrode 21 is enlarged and terminates in a downwardly directed parti-spherical or cup-shaped receiver pocket 25 having a magnet member 26 embedded therein. The radius of curvature of the cup-shaped portion 25 is formed to correspond with the radius of curvature of the consumable members 20 so as to provide a maximum area of contact at the interface between the electrode and the consumable member.

In order to form a weld, the active electrode 21 is shifted downwardly past the magnet 18, which downward movement will result in the lowermost consumable member 20 being removed from magnet 18 and retained within the cup member 25 by the magnet 26. Further downward movement of the active electrode 21 will cause the consumable member 20 to press tightly against the upper surface of the sheet 10 with a desired downward force.

By way of example and without limitation, the members 20 may be comprised of ⅛" diameter steel balls. The hardness of the steel is not particularly critical, it being oserved that virtually any steel composition will be of greater hardness than the zinc coatings 10', 11' applied to the metal sheets 10, 11. Preferably, the balls are selected of a material which melts at a temperature comparable to that of the galvanized sheets. A downward force of from about 50 to 80 pounds has been found satisfactory with the use of ⅛" diameter balls to achieve the desired degree of electrical contact with the upper sheet 10.

With the parts positioned as shown in FIG. 2, the apparatus is in condition for formation of a spot weld. It will be noted that the consumable member or ball 20' is held from descending the guideway 22 by the side surface of the insulating sleeve 23. Obviously the diameter of the chamber at the lower end of the electrode assembly 15 is coordinated with the size of the balls such that only a single ball can occupy the chamber at any given time, and (in the raised position of the electrode) the ball positioned within the chamber and retained on the magnet 18 operates to block downward movement of the next adjacent ball 20'.

A welding current is then passed through active electrode 21, ball 20, sheets 10 and 11, and to ground electrode 12, while a downward force is continuously applied. As noted, utilizing a ⅛" diameter steel ball, a 10 kva power pack may be employed for a welding cycle of 1/10th second to achieve an effective spot welding of galvanized sheets of thickness varying from 18 to 24 gauge. The welding assembly 15 incorporates a stop mechanism (not shown) which functions to prevent the lowermost end 27 of the electrode from actually contacting the uppermost sheet 10.

After formation of the weld, FIG. 3, the sleeve 23 carrying electrode 21 is raised to its upper limiting position, FIG. 1, whereupon the now lowermost ball 20' will be fed gravitationally to the position previously occupied by the ball 20.

The sheets 10, 11 will be shown to be securely spot welded together, the appearance of the formed weld 28 normally differing slightly from the appearance of a conventional spot weld in that the weld in accordance with the invention includes a slight protuberance or projection 29 whereas a conventionally formed spot weld generally includes a slight recess in the area engaged by the electrode during the formation of the weld.

In contrast to the 1/10th second weld cycle used in accordance with the invention with a 10 kva power pack to spot weld galvanized sheets of the thickness range noted, conventional spot welding procedures require the utilization of ½ second welding cycles using 20 to 40 kva power packs to assure connection of the sheets in situations where initial contact with the sheets was imperfect. It will thus be observed that substantial energy savings are realized through the use of the method and apparatus of the present invention, and also, the initial investment in welding equipment is lessened.

A further advantage in the use of the present invention is that the heat build-up in the electrode is reduced since much of the heat is concentrated in the consumable member and such member remains as a part of the spot welded sheets. Thus, where a cooling system is employed for reducing the temperature in the active electrode, the capacity of such system may be substantially less than is the case in conventional spot welding methods.

The weld is effected with minimal arcing and spattering, and where a flat electrode is employed on one surface, discoloration or burning of the sheet adjacent the ground electrode is minimized.

Spot welds may be effected with a high degree of predictability since the condition of the welding tip formed by the consumable member is identical in each instance.

The consumable member is preferably selected so as to melt in the same general temperature range as the sheets to be welded.

While the device for practicing the instant method has been illustrated as an automatic feeding device wherein the consumable members are mechanically fed to the welding electrode during each welding cycle, it will be recognized that many of the advantages of the present invention may be achieved utilizing a manual application of the consumable welding tip to the active electrode.

Central to the concept of the instant invention is the use of a consumable member which functions as a replaceable welding tip, the depth of the consumable member, i.e. the distance from the point of contact with the metal sheet and the welding electrode, being minimal, i.e. not substantially greater than the maximum cross-sectional area of the consumable member, the contact area between the electrode and consumable member being at a maximum, i.e. about 20% or more of the surface area of the metal member, and the contact area between the consumable member and sheet being at a minimum to facilitate penetration.

While the consumable member is preferably selected of a material such that the same will melt and flow into the weld in the course of the formation thereof, certain of the benefits of the invention may be achieved where the consumable member, while having the other attributes hereinabove noted, is not completely deformed in the course of formation of the weld.

The apparatus preferably includes a stop means (not shown) for limiting movement of the electrode 21 toward the sheets to prevent direct contact of the sheets and electrode. Such stop means may take the form, by way of example, of a thin insulating rim fixed to the electrode surrounding the tip and projecting a slight distance therebelow.

While the apparatus of the invention has been illustrated utilizing a magnet in the electrode supporting the spherical consumable members, it will be apparent that other support means, such as a friction support, may be suitably employed.

It is also feasible to employ an opposed pair of electrodes, each having consumable tip members, for the formation of the spot weld, although such arrangement will not normally be required.

While the principal utility for the present invention is considered to reside in the spot welding of galvanized sheets, it will be appreciated that the underlying concept may be employed in the connection of metal sheets other than galvanized or ferrous sheets.

From the foregoing disclosure it will be readily recognized by those skilled in the art that modifications and variations may be made without departing from the spirit of the invention. Accordingly, the invention is to be broadly construed within the scope of the appended claims.

Having thus described the invention and illustrated its use, what is claimed as new and is desired to be secured by Letters Patent is:

1. The method of connecting two superimposed sheets of galvanized coated ferrous metal by welding which comprises the steps of contacting an area of an outer surface of one of said superimposed sheets with a first electrode, contacting an outer surface of the other of said superimposed sheets at an area in registry with said area contacted by said first electrode with a consumable ferrous metal member having a greater hardness than the galvanized coating to provide the necessary penetration to the ferrous metal of said superimposed sheets, said consumable metal member having a reduced contact area engaging said surface of said other sheet, contacting a major portion of the surface of said consumable metal member with a conductive carrier electrode, and continuously urging said carrier electrode toward said first electrode while simultaneously passing an electrical current between said electrodes sufficient substantially to deform said consumable metal member and to interfuse contacting portions of said sheets disposed between said member and said first electrode.

2. The method in accordance with claim 1 wherein said consumable metal member comprises a sphere and said carrier electrode includes a parti-spherical pocket portion conforming to the surface of said sphere.

3. The method in accordance with claim 2 and including the step of automatically feeding a consumable metal member to said carrier electrode responsive to movement of said carrier electrode away from said sheets.

4. The method in accordance with claim 2 wherein said sphere is comprised of ferrous metal having a melting temperature generally equal to the melting temperature of said sheets.

5. The method in accordance with claim 4 and including the step of magnetically supporting said sphere in said pocket portion of said tip.

6. The method of spot welding two superimposed sheets of galvanized coated ferrous metal which comprises the steps of contacting an area of an outer surface of one of said superimposed sheets with a first electrode, contacting an outer surface of the other said superimposed sheets at an area in registry with said first electrode with a consumable metal member shaped to define substantial point contact with said other sheet, said consumable metal member having a greater hardness than the galvanized coating to provide penetration of the galvanized coating to the ferrous metal of said superimposed sheets, engaging areas of said consumable metal member larger than the area contacting said other sheet with a second electrode, biasing said second electrode toward said first electrode while simultaneously passing an electrical current through a conductive path including said second electrode, said consumable member, said sheets and said electrode, thereby to interfuse said contacting portions of said sheets and portions of said consumable metal member, and substantially completely deform said consumable metal member.

7. The method in accordance with claim 6 and including the step of interrupting movement of said second electrode toward said first electrode after said substantial deformation of said consumable member and in advance of contact between said second electrode and said other sheet.

8. The method in accordance with claim 7 wherein said consumable member comprises a ferrous sphere.

9. The method in accordance with claim 8 and including the step of magnetically supporting said sphere to said second electrode.

10. The method of connecting by spot welding two superimposed sheets of metal having galvanized surface coatings which comprises the steps of contacting the area of an outer surface of one of said superimposed sheets with a first electrode, penetrating the galvanized coating surface of the other of said superimposed sheets at an area in registry with the first area with a consumable metal member formed of a material compatible with at least the other of said superimposed sheets, said consumable metal member having a greater hardness than the galvanized coating and being meltable at substantially the same temperature as said sheets and having a reduced contact area engaging said surface of said other sheet, contacting a major portion of the surface of said consumable metal member with a conductive carrier electrode and continuously urging said carrier electrode toward said first electrode while simultaneously passing an electric current between said electrodes sufficient substantially to deform said metal member and interfuse contacting portions of said sheets disposed between said member and said first electrode.

11. The method in accordance with claim 10 wherein said consumable metal member comprises a sphere and said carrier electrode includes a parti-spherical pocket portion conforming to the surface of said sphere.

* * * * *